Nov. 7, 1961  C. L. BARKER  3,007,485
NON-RETURN VALVES
Filed Feb. 25, 1958

INVENTOR
CLIFFORD L. BARKER
BY 3,007,485
NON-RETURN VALVES
Clifford L. Barker, Cheltenham, England, assignor to Walker, Crosweller & Company Limited, Cheltenham, England
Filed Feb. 25, 1958, Ser. No. 717,502
Claims priority, application Great Britain Feb. 27, 1957
1 Claim. (Cl. 137—454.2)

When a device for mixing two different fluids such as hot water or steam and cold water, is fitted in position, it is known to connect a separate supply pipe for each of the two fluids into a corresponding inlet in the body of the appliance; further, to minimise the possibility of either of the fluids obtaining access to and flowing away from the appliance through the supply pipe of the other fluid, it is also known to provide a non-return valve in each of the said supply pipes. The present invention has reference to non-return valves which are particularly suitable for this purpose.

The principal object of the present invention is to facilitate the fitting and/or the removal and replacement of a non-return valve in a fluid supply pipe.

A further object of the invention is to enable a non-return valve to be fitted in a union between two lengths of pipe, and the union to be effected, quickly and easily even by unskilled persons, and to provide a union which is neat in appearance and compact in construction.

The above and other objects and advantages of the invention will become apparent from the following detailed description taken in connection with the accompanying drawing in which.

Figure 1:
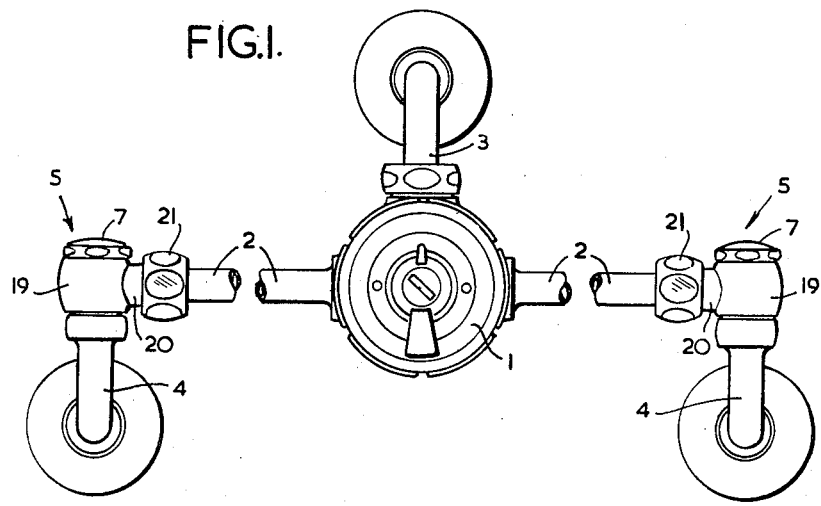
FIGURE 1 is an elevation of a fluid mixing device with its associated supply and discharge pipes.

The fluid mixing device 1 shown in FIGURE 1, is provided with two axially aligned inlet passages into each of which one end of a corresponding branch pipe 2 is secured, and with a mixture discharge orifice into which one end of a discharge pipe 3 is secured.

The opposite end of each branch pipe 2 is connected to and in communication with, a corresponding supply pipe 4 through a non-return valve 5 which enables fluid to flow freely from either supply pipe to the corresponding branch pipe and inlet passage of the mixing device, but prevents flow of fluid in the reverse direction.

Figure 2:
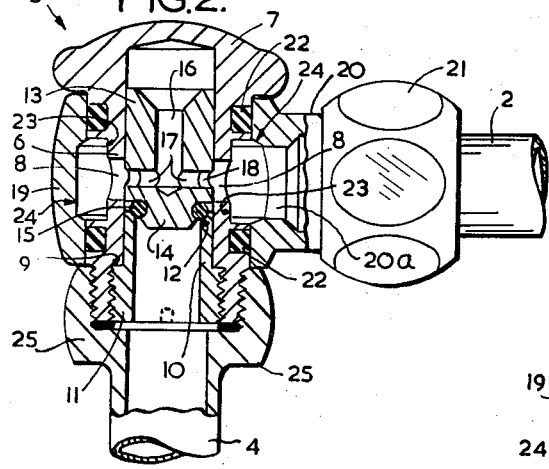
FIGURE 2 is an elevation, on an enlarged scale and, partly in section, of a non-return valve which is installed in each of the supply pipes shown in FIGURE 1.
Figure 3:
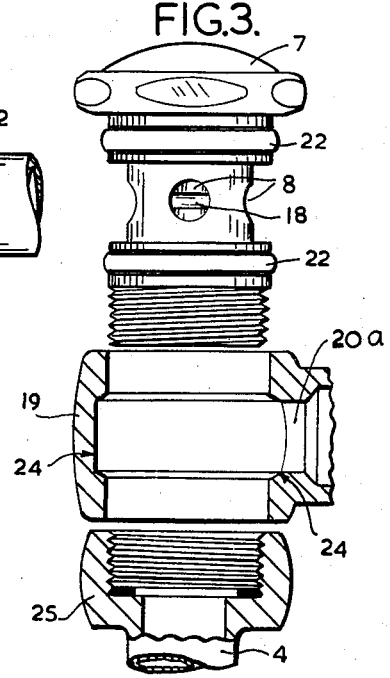
FIGURE 3 is an exploded view, partly in section, of the valve shown in FIGURE 2.

Each non-return valve comprises (as shown more clearly in FIGURES 2 and 3) a thimble 6 having a head or enlargement 7 at closed end or crown and, between the said head and the mouth of the thimble, a system of four ports 8, each of which opens from the interior and to the periphery of the thimble, the said ports being spaced at ninety degrees apart around the said thimble.

The mouth or open end of the thimble is screw-threaded both externally and internally, the internal thread reaching to a peripheral shoulder 9 formed on and around the internal surface of the thimble between its open end and the ports 8. A sleeve 10 having an enlarged diameter and externally threaded end 11 is accommodated within and co-axially of the thimble, the head 11 being screwed into the internally threaded end of the thimble until its enlarged diameter end abuts the shoulder 9. The axial dimensions of the sleeve is less than the distance between the ports 8 and the open thimble end so that, when the sleeve end 11 is in abutment with the shoulder 9 the rim of its inner extremity is spaced from the said ports. The said rim is chamfered around its periphery to provide a valve seat 12.

A plunger 13 which serves as the moveable member of the non-return valve and is of an axial dimension less than the distance between the valve seat and the closed end of the thimble interior, makes a sliding fit within the said interior so that it is adapted to be reciprocated axially of and within the thimble away from and towards the said seat.

The plunger end adjacent the seat 12, has a tapered nose of projection 14, a groove is formed in and around the root of the nose and a resilient ring 15 adapted to abut the said seat and effect a fluid-tight seal between the sleeve and the plunger, is engaged in the said groove.

A blind axial passage 16 extends from the end face of the plunger which is adjacent the thimble head, and two radial passages 17 arranged at one hundred and eighty degrees apart around the plunger, extend from the closed end of the bore to a groove 18 formed in and around the periphery of the plunger at a distance from the tapered head 14 such that when the ring 15 is in abutment with the valve seat, the radial passages are in communication with the sleeves ports 8, the said communication being ensured by the groove 18.

The thimble 6 extends through and is a loose fit within the eye of an annulus 19 which is of a depth less than the distance between the head and mouth of the said thimble so that when the said head is in abutment with the adjacent rim of the annulus, the externally threaded thimble end projects beyond the opposite rim of the said annulus.

The said annulus is provided with a radially projecting and bored stem 20 of which the end remote from the annulus is externally screw threaded and of which the bore 20ª opens into the said eye, the said threaded stem end being secured to the adjacent end of the corresponding branch pipe 2 by a union nut 21 carried by the pipe, thereby establishing communication between the bore of the branch pipe and the eye of the annulus.

To prevent fluid from leaking between the wall of the annulus eye and the periphery of the thimble, the latter has two peripheral grooves of which one is located adjacent its head 7 and the other is located adjacent its threaded end, and a resilient sealing ring 22 accommodated within each of the said grooves is compressed between the internal surface of the eye and the bottom of the corresponding groove. The distance between the sealing rings 22 is such that, when the thimble head abuts the adjacent annulus rim, the said rings are located on opposite sides of the stem bore 20ª and the thimble ports 8.

Between the ring-accommodating grooves in the thimble, a further and wider groove 23 is formed in and around the external periphery of the thimble, the said groove registering with the adjacent end of the bore 20ª and with a complementary groove 24 formed in and around the internal periphery of the annulus 19, thereby establishing communication between the ports 8 and the bore of the stem 20 and branch pipe 2.

The externally threaded and projecting end of the sleeve is engaged by a coupling 25 provided on the end of the corresponding supply pipe 4 and screwed into abutment with the adjacent rim of the annulus 19 so that the bore of the supply pipe is in communication with the interior of the thimble, the annulus is clamped between the head 7 and the union 25, and the thimble is held stationary within the annulus. Hence, when fluid flows along either supply pipe to the corresponding non-return valve, it enters the interior of the thimble and lifts the plunger from the seat 12; consequently the fluid is permitted to flow to and through the ports 8, complementary grooves 23, 24, stem bore 20ª and the corresponding branch pipe 2, to the mixing device.

However, as soon as the flow of fluid ceases, the plunger drops back on to the seat under the action of gravity and/or of the back pressure existing in the said branch pipe which back-pressure may be created by fluid flowing from the other branch pipe and through the mixing device. Any such back pressure is transmitted through the bore 20ª complementary grooves 23, 24, ports 8, plunger groove 18 and passages 17, 16, to the clearance between the closed end of the thimble interior and the plunger, thereby urging the latter on to the seat 12 and ensuring that the fluid is prevented from flowing beyond the said seat.

Should the non-return valve develop a fault due, for example, to excessive wear, to corrosion and/or to the wedging of the plunger by solid particles of foreign matter gaining access to the interior of the thimble, the thimble may be withdrawn from the annulus after disconnecting the union 25 from the projecting threaded thimble end, whereupon it may be replaced by a fresh thimble, seat and plunger assembly to remedy the fault. This removal and replacement of the faulty assembly may be carried out by unskilled persons quickly and easily so that the mixing device need not be out of commission for a period longer than is required to carry out the said replacement. The removed assembly may, therefore, be serviced and repaired at leisure.

From the foregoing description, taken in conjunction with the accompanying drawing, it will be apparent to those skilled in the art, that I have devised a novel, efficient and simple type of non-return valve in which the moveable valve member and the complementary valve seat are assembled within a readily replaceable container so that any fault which may develop in the valve may be remedied speedily and easily, even by unskilled persons; by replacing the defective assembly by an assembly which is in working order. Whilst the said description and drawing describes and illustrates respectively a typical and practical embodiment of the invention, it is to be understood that departures may be made therefrom within the scope of the invention which is not to be limited to the details disclosed herein, but is to be accorded the full scope of the claims so as to embrace any and all equivalent non-return valves.

What I claim is:

A check valve comprising a generally cylindrical open ended body having a groove on the inner surface thereof, a fluid conducting conduit connected to said body in communication with said groove, a thimble having a head closing one end thereof and slidably mounted in said body with said head engaging one edge of said body and closing the corresponding end with a portion of the thimble projecting from the other end of said body, a pair of grooves formed in the exterior surface of said thimble and spaced so that a thimble groove is disposed on each side of said body groove, a sealing ring seated in each thimble groove to prevent leakage from said body groove, said thimble having ports in a wall thereof in radial alignment with said body groove, whereby fluid in said thimble may flow through said ports and said groove to the fluid conducting conduit, a pipe coupling detachably connected to the projecting portion of said thimble and engaging the other edge of said body to firmly and detachably mount said thimble in said body, a sleeve detachably connected within the projecting portion of the thimble and having an upper annular surface defining a valve seat, and plunger means mounted in said thimble for reciprocatory movement between the valve seat and the closed end of the thimble to permit fluid flow from said pipe coupling to said fluid conducting conduit but prevent flow from the conduit to said coupling, and whereby upon detachment of the pipe coupling from the thimble the latter may be removed from the body as a unit with the sleeve attached thereto and the plunger disposed therein.

References Cited in the file of this patent

UNITED STATES PATENTS

| | | |
|---|---|---|
| 712,738 | Stevens | Nov. 4, 1902 |
| 1,029,464 | Ruwell | June 11, 1912 |
| 1,434,963 | Rogert | Nov. 7, 1922 |
| 1,493,409 | Wiley | May 6, 1924 |
| 1,754,975 | Anderson | Apr. 15, 1930 |
| 1,854,051 | Andrew | Apr. 12, 1932 |
| 2,192,425 | Allen | Mar. 5, 1940 |
| 2,234,932 | Schlaupitz | Mar. 11, 1941 |
| 2,307,328 | Martin | Jan. 5, 1943 |
| 2,400,658 | Shepherd | May 21, 1946 |
| 2,486,215 | Shields | Oct. 25, 1949 |
| 2,538,133 | Tratzik | Jan. 16, 1951 |

FOREIGN PATENTS

| | | |
|---|---|---|
| 651,499 | Great Britain | Apr. 4, 1951 |